(12) United States Patent
Monette et al.

(10) Patent No.: US 6,284,372 B1
(45) Date of Patent: Sep. 4, 2001

(54) COMPOSITES WITH INTERPHASES AND METHODS OF MAKING THE SAME

(75) Inventors: Liza M. Monette, Flemington; Arnold Lustiger, Edison; Michael P. Anderson, Gillette; John P. Dismukes, Annandale, all of NJ (US); H. Daniel Wagner, Rehovot (IL); Cary N. Marzinsky, Stockton; Russell R. Mueller, Washington, both of NJ (US)

(73) Assignee: Exxon Research and Engineering Co., Annandale, NJ (US)

( * ) Notice: Subject to any disclaimer, the term of this patent is extended or adjusted under 35 U.S.C. 154(b) by 0 days.

(21) Appl. No.: 08/198,808

(22) Filed: Feb. 18, 1994

Related U.S. Application Data

(62) Division of application No. 07/846,642, filed on Mar. 5, 1992, now Pat. No. 5,288,555.

(51) Int. Cl.$^7$ ........................................... D02G 3/00
(52) U.S. Cl. ............................................. 428/375; 428/378
(58) Field of Search ........................................ 428/375, 378

(56) References Cited

U.S. PATENT DOCUMENTS 3,812,077 * 5/1974 Hobbs ................................. 260/40 R

* cited by examiner

Primary Examiner—Edward J. Cain
(74) Attorney, Agent, or Firm—Jay Simon

(57) ABSTRACT

A composite having fibers of relatively high elastic modulus embedded in a matrix of relatively low elastic modulus is provided with an interphase of elastic modulus less than the matrix modulus and cohesive energy higher than the matrix cohesive energy. The resulting composite has enhanced strength and toughness.

6 Claims, 5 Drawing Sheets

COMPOSITES WITH INTERPHASES AND METHODS OF MAKING THE SAME

This is a division of application Ser. No. 846,642, filed Mar. 5, 1992 now U.S. Pat. No. 5,288,555.

FIELD OF THE INVENTION

The present invention relates to the field of composite materials, and more particularly relates to composites incorporating fibers in a matrix and an interphase surrounding the fibers.

BACKGROUND OF THE INVENTION

By definition, composite materials include two or more phases having different physical characteristics. Many composites incorporate fibers, typically of a relatively rigid material, in a matrix of another material which ordinarily is less rigid. For example, polymers are often reinforced with fibers of glass, ceramic or carbon, whereas metals may be reinforced with ceramic fibers.

Composites present unique problems not encountered with uniform, single phase materials. Practical processes for producing composite materials and forming them into the desired shapes impose limits and tradeoffs. It is often less expensive to make a fiber reinforced composite using relatively short fibers and with a relatively low ratio of fiber volume to matrix volume. Conversely, the physical properties of the composite such as tensile strength and tensile modulus often improve with increasing fiber volume and particularly with increasing fiber length. Design of a composite often involves balancing these competing considerations.

It has long been recognized that the length of the fiber influences the degree to which loads such as tensile loads are borne by the fiber as opposed to the surrounding matrix. This may be illustrated by considering the case of a fiber embedded in a surrounding matrix, the fiber having substantially higher modulus of elongation than the surrounding matrix material, and the entire assembly being subjected to a tensile load in the direction of the fiber. As loads can be transferred to the fiber only through the immediately adjacent matrix material, the total tensile force applied to the fiber is directly related to the load borne by the region of matrix material immediately surrounding the fiber. With a very short fiber, the region of matrix material which immediately surrounds the fiber is relatively small and hence the load transferred to the fiber for a given deformation of the matrix material is also relatively small. Thus, even where the matrix material has deformed to its breaking point, the amount of load transferred to the fiber may be very small. Conversely, for a very long fiber there is substantial region of matrix material surrounding the fiber, and the amount of load transferred to the fiber per unit deformation of the matrix material is correspondingly large. Therefore, substantial loads will be applied to the fiber even at relatively small deformations of the matrix material.

With very short fibers the fibers will remain unbroken when the composite is broken, whereas for very long fibers the fibers will be broken before the composite breaks. The term "critical length" is ordinarily used to refer to the fiber length forming the boundary between these two types of fracture behavior. For fiber lengths less than the critical length the matrix material will break leaving the fibers intact when the composite is stressed to failure, whereas for fiber lengths above the critical length the fibers will break before the matrix material breaks. The length of a fiber is often expressed in terms of its aspect ratio, i.e., the ratio between the length of the fiber in its direction of elongation and the diameter or largest dimension of the fiber in a direction perpendicular to its direction of elongation. The critical length can be stated as a critical aspect ratio.

Numerous attempts have been made at predicting the critical aspect ratio. One widely used predictive method is the so-called "shear lag" theory of Cox, BR. J. Appl. Phys. Vol. 3, p. 72 et seq. (1952). The shear lag theory makes certain simplifying assumptions about the system. As discussed in Asloun et al., Stress Transferred in a Single-fiber Composites: Effect of Adhesion, Elastic Modulus of Fiber and Matrix and Polymer Chain Mobility, J. Materials Sci. Vol.24, pp. 1835–1844 (1989) the Cox theory with refinements added by others leads to the conclusion that the critical aspect ratio is proportional to a constant times the square root of the ratio between the tensile elastic modulus of the fiber and the corresponding tensile modulus of the matrix material.

Termonia, J. Materials Sci. Vol. 22, pp. 504–508 (1987) applies a computer based nodal model. The model is based upon geometric conception of fibers embedded in a matrix as a two dimensional system and representation of that two dimensional system as a grid of theoretical points or "nodes" at rectilinear spacings. Node equations relate the forces acting between two adjacent points and the relative positions of these adjacent points. These equations incorporate certain properties of the materials present at those theoretical points. This model is then actuated by applying a theoretical deformation to the entire model and then determining the resulting locations for various nodes, and the deformations from the original starting positions, by a process of repetitive trial and error using known mathematical algorithms for solving large numbers of simultaneous conditions by approximation. The Termonia article does not disclose the equations relating the forces at individual points to relative deformations between those points. The Termonia model is further elaborated and discussed in additional articles by the same author, viz., Computer Model For The Elastic Properties Of Short Fiber And Particulate Filled Polymers, J. Materials Sci. Vol. 22, pp. 1733–1736 (1987); Tensile Strength Of Discontinuous Fiber-Reinforced Composites, J. Materials Sci. Vol. 25, pp. 4644–4654 (1990); and Computer Model For The Elastic Properties Of Short Fiber and Particulate Filled Polymers, J. Materials Sci. Vol. 22, pp. 1733–1736. The Termonia model generally leads to the prediction that the critical length is proportional to a constant times the ratio between the fiber elastic modulus and the matrix elastic modulus.

Attempts have been made towards enhancing the performance of composites by providing an "interphase" between the fibers and the surrounding matrix material. As distinguished from an interface of molecular scale dimensions, an interphase constitutes a distinct phase having physical properties different from those of the fiber and different from those of the matrix. European Patent Application 0,294,819 describes continuous fiber composites having high modulus fibers such as carbon, glass or aramid disposed in a relatively low-modulus matrix of an organic polymer and also having an interphase surrounding each fiber. The interphase has an elastic modulus intermediate between those of the fiber and those of the matrix.

Hobbs, U.S. Pat. No. 3,812,077 discloses composite materials incorporating a polymeric matrix and high-modulus fibers. The fibers are provided with a nucleating agent so as to promote crystallization of the polymer in planes perpendicular to the fiber axis during a manufacturing process in which the coated fibers are disposed in molten polymer and the resulting blend is cooled to solidify the polymer. Thus, the polymer in the vicinity of the fibers has a crystalline state different from the crystalline state of the surrounding matrix polymer. The specially crystallized material surrounding the fiber forms an interphase between the fibers and the surrounding matrix. The '077 patent refers to composites incorporating very short fibers, typically 0.01–025 inches and also to test samples incorporating apparently continuous fibers. It does not discuss the physical properties of the interphase in detail. Carvalho et al, Thermoplastic/fiber composites; Correlation Between Interphase Morphology and Dynamic Mechanical Properties, European Polymer Journal, Vol. 26, No. 7, pp. 817–821 (1990) also describes a system incorporating a polymeric matrix and an interphase of specially crystallized polymer created by use of a nucleating agent on the fibers. These composites are apparently continuous fiber laminate-type composites. Other references discussing composites with interphases formed by crystallization around the fiber include Kantz et al, J. Polym. Sci. Polym. Lett. Ed., Vol. 11, pp. 279–284 (1973); Kantz et al, Am. Chem. Soc. Div. Org. Coat. Plast. Chem. Pip., Vol. 34, pp. 361–365 and an abstract of a PhD dissertation of Melvin R. Kantz entitled, "Deformation Behavior of Continuous Thermal Plastic Fiber Reinforced Polypropylene Composites", Diss. Abstr. Int. B, Vol. B36, p. 389 (1975). Also, Kantz, "The Mechanical Properties of Organic Fiber Reinforced Polypropylene Composites, Polym. Prepr. Am. Chem. Soc. Div. Polym. Chem., Vol. 14, pp. 447–452 discusses the properties of composites incorporating continuous organic fibers in an organic matrix. Campbell et al, Enhanced Fracture Strain of Polypropylene by Incorporation of Thermoplastic Fibers, J. Materials Science Vol. 12, pp. 2427–2434 (1977) discloses continuous fiber composites with polymeric matrices and with transcrystalline regions in the vicinity of the fibers. Huson et al, "The Effect of Transcrystallinity On the Behavior of Fibers in Polymer Matrices", J. Polymer Science, Polymer Physics Edition Vol. 23, pp. 121–128 (1985) describes the effect of transcrystallinity on experiments concerning pull-out of a single copper fiber from a polypropylene matrix.

F. J. McGarry, in a paper entitled, "Thin Elastomer Films in Glassy Polymers", p. 173 in "Rubber Toughened Plastics", Advances in chemistry series #222, The American Chemical Society, Washington, D.C., 1989, describes apparently continuous-fiber composites incorporating graphite fibers in an epoxy matrix. Certain of the composites described therein have a soft, rubbery interphase surrounding each continuous fiber.

Despite all of these developments in the art, there have been significant needs for still further improvements. Thus, neither of the aforementioned approaches to predicting critical length has been successfully applied to prediction in systems which include an interphase. Indeed, the work employing interphases has generally disregarded the concept of critical length. This work has been concerned either with continuous fiber composites having fiber lengths which vastly exceed the critical length or with discontinuous fiber composites having fiber lengths selected without regard for the concept of critical length. The resulting composites accordingly have not provided an optimum balance between processing and other considerations favouring short fiber lengths and advantages in physical properties attributable with long fiber lengths. For these and other reasons, there have been substantial needs for further improvements in composites and in methods of making composites.

SUMMARY OF THE INVENTION

The present invention addresses these needs.

One aspect of the present invention provides a method of making a composite incorporating fibers, a matrix, and an interphase surrounding the fiber and hence interposed between the fibers and the matrix. A method according to this aspect of the invention preferably includes the step of operating a nodal model of the composite. This model includes a plurality of notional spaced apart nodes representing points within at least one fiber of finite aspect ratio extending in an elongation direction, within an interphase surrounding the fiber and within a matrix surrounding the interphase. The term "notional" is used in relation to the nodes of the model to denote that the model is not an actual composite but in fact is a representation of a composite such as a computer-based mathematical representation.

The model further includes functions representing the mechanical properties of the fiber, the matrix and the interphase as interrelations between displacement of each such notional node relative to each adjacent node and the forces or, preferably, the strain energy stored in deformation between these adjacent nodes. That is, the functions relate the relative displacement of each pair of adjacent nodes with forces exerted between these nodes or, preferably, with strain energy. Typically, terms in each such function are based at least in part upon the mechanical properties of the materials notionally present between such nodes. The functions are selected so that the forces between nodes or strain energies predicted by the functions include components representative of shearing stresses in the materials. In a particularly preferred arrangement, the nodes may be arranged in a triangular or pyramidal lattice, and the model may include notional bonds interconnecting nearest-neighbor points in this lattice with one another. The functions may include equations defining the relationship between force or strain energy along each such bond and the length of the bond. Most preferably, the functions also include terms representative of changes in angles between bonds.

Preferred methods in accordance with one aspect of this invention include the step of operating the model by applying at least one deformation in the model so that the model indicates that the composite would fracture under this notional load or deformation. Most preferably, fracture of individual bonds is determined from strain energy considerations. The method desirably includes the step of determining whether fracture of the composite involves fracture of the fiber or fracture of the matrix, and may also include repeated operation with the model representing fibers of different lengths until the model shows matrix fracture for fibers of at least a first aspect ratio and fiber fracture for fibers of at least a second aspect ratio. In this fashion, the model predicts a critical aspect ratio.

Methods according to this aspect of the present invention preferably further include the steps of selecting a real fiber, real interphase, and real matrix based at least in part upon the results achieved in operation of the model. The fiber, matrix and interphase desirably are selected so that the real fiber and real matrix have physical properties substantially corresponding to the physical properties represented by the functions of the model. Preferably the real fibers have an aspect ratio above the critical aspect ratio predicted by the model. The method also includes the step of incorporating the real fibers, interphase and matrix in a real composite.

Methods according to this aspect of the present invention may further include the step of repeating the operation of the model while varying at least one parameter in the model functions defining a physical property in the model on successive operations, so that the model predicts the critical aspect ratio for a plurality of fiber, interphase and matrix combinations having different values of at least one parameter varied in said successive operation. The step of providing the real fibers, real interphase real matrix desirably includes the step of providing the real fiber, real interphase and real matrix so that their real mechanical properties approximate at least one of the sets of mechanical properties used in the repeated operations of the model, and the fibers have an aspect ratio at least equal to the critical aspect ratio predicted by the model for that set of mechanical properties. A method according to this aspect of the present invention may include the step of selecting from among the plural sets of mechanical properties utilized in the various operations of the model an optimized set of mechanical properties. For example, the optimized set may be the set for which the critical aspect ratio is a minimum. That is, the apparent fiber, interphase and matrix mechanical properties utilized in the real composite represent those mechanical properties for which the model predicts that the critical aspect ratio is at or close to minimum with respect to at least one of the parameters used in model. Alternatively, the optimized set may be selected to provide maximum toughness or energy to fracture.

A further aspect of the invention provides composites having enhanced performance. Composites according to this aspect of the invention incorporate fibers formed from a fiber material and a matrix formed from a matrix material, together with an interphase form from an interphase material surrounding the fibers and hence interposed between the fibers and the surrounding matrix. Each of these materials has apparent elastic modulus and apparent cohesive energy. The term "apparent" as used with reference to a physical property in this disclosure refers to the properties of the material which would be observed upon testing. That is, the apparent cohesive energy is the average cohesive energy which would be exhibited by samples of the material, whereas the apparent elastic modulus is the average elastic modulus which would be exhibited by samples of the material. Most preferably, the apparent elastic modulus of the interphase is lower than the apparent elastic modulus of the matrix, typically about 0.2–0.8 times the elastic modulus of the matrix. The apparent cohesive energy of the interphase is greater than the apparent cohesive energy of the matrix. Stated another way, the interphase material is softer but tougher than the matrix. Most preferably, the thickness of the interphase is between about 0.1 and about 10 times the diameter of the fiber, and interphase thicknesses between 0.2 and about 2.0 times the fiber diameter are particularly preferred. Most preferably, the fibers are discontinuous but of supercritical length. That is, the fiber length is such that upon fracture of the composite under tensile load in the fiber direction, the fibers will break. The apparent properties of the fiber matrix and interphase, together with the diameter of the fibers and the thickness of the interphase define a model critical aspect ratio. The model critical aspect ratio is the critical aspect ratio which would be predicted by the aforementioned nodal model for a composite having properties matching the apparent properties of the materials, and also having the fiber diameter and thickness of the real composite. Thus, there is a model critical aspect ratio for every real composite, and that value is a function solely of the properties, fiber diameter and interphase thickness.

Preferably, the actual aspect ratio of the fibers is greater than the model critical aspect ratio, i.e., the fibers are longer than the critical length which would be predicted by the nodal model discussed above for the system.

This aspect of the present invention incorporates the discovery that the particular combination of an interphase having elastic modulus lower than the elastic modulus of the matrix but also having cohesive energy greater than the cohesive energy of the matrix greatly enhances load-sharing between the fibers and the matrix, particularly where the fiber/matrix elastic modulus ratio is relatively high, i.e., where the composite incorporates a relatively stiff fiber in a relatively soft matrix. Systems of this nature typically have fibers/matrix elastic modulus ratios of about 10:1 and more typically above about 20:1. Such systems include numerous commercially important fiber and matrix combinations, particularly those where the matrix includes an organic polymer.

Preferred composites according to this aspect of the invention include those having matrix materials selected from the group consisting of thermoplastic and thermosetting polymeric materials. Preferred thermoplastics include polymethylmethacrylate, polycarbonate, polystyrene and, particularly, polyolefins such as polypropylene and polyethylene. Preferred thermosets include polyesters, phenolics, vinylesters, bismaleimides, polyimides and epoxies. Preferred fiber materials include polyethers, aramids, metallic materials and non-metallic inorganic materials such as carbon and glass, the group consisting of carbon and glass being particularly preferred. This aspect of the invention incorporates the discovery that, in composites incorporating relatively stiff fibers embedded in organic polymers, the performance of the composite can be materially enhanced by tailoring the interphase so that the interphase modulus is less than a modulus of the matrix but the interphase is tougher than the matrix.

The enhanced load-sharing afforded by this aspect of the invention can be reflected in different ways. Thus, the critical length for a given fiber and matrix, with the interphase as discussed above, is substantially less than the critical length for the same fiber and matrix but with an interphase having different properties or with no interphase, i.e., with the interphase replaced by matrix material or with the properties of the interphase assumed equal to those of the matrix. Accordingly, composites according to this aspect of the invention can have actual fiber lengths less than those usable with other interphases or with no interphase, while still having a fiber length greater than the critical length. Another manifestation of the enhanced load-sharing achieved with composites according to this aspect of the invention is increased toughness of the composite as a whole. Composites with the interphase as discussed above tend to have greater toughness than other composites incorporating identical fibers and matrix.

Various modalities can be employed to provide the desired relationship between interphase properties and the properties of the fiber and matrix as discussed above. In the most straight-forward approach, the fiber material, matrix material and interphase material are each homogeneous materials having different chemical composition. Alternatively, one or more of these materials may incorporate physical means for altering its apparent properties. For example, the apparent properties of a homogeneous matrix polymer may be altered by blending the polymer with microscopic particles of a filler to form a matrix material which itself is a composite and which has apparent or properties different from the intrinsic properties of the original polymer. Alternatively, the interphase material may be chemically identical to the fiber material, or, preferably, chemically identical to the matrix material, but the two identical materials may be in different physical states. In one arrangement, the matrix material includes a crystalline or partially crystalline polymer such as polypropylene, and the interphase includes polypropylene having transcrystallinity, i.e., having crystals extending generally transverse to the axis of the fiber. Such preferential crystallization can be induced, for example, by applying nucleating agents to the surfaces of the fibers and embedding the fibers in the molten polymer and cooling the mixture so that the polymer solidifies in presence of the fibers and the nucleating agents. Thus, the interphase, although chemically identical with the surrounding matrix polymer, forms a distinct physical phase with different physical properties than the surrounding matrix. In this regard, it should be understood that the enhanced properties discussed above are not limited to, and will not necessarily arise with, any particular crystalline orientation or crystal growth method unless that crystal growth method is controlled so as to yield the desirable relationships between the properties of the interphase and the matrix and fiber properties.

These and other objects, features and advantages of the present invention will be more readily apparent from the detailed description of the invention set both below taking in conjunction with the accompanying drawings.

DETAILED DESCRIPTION OF THE PREFERRED EMBODIMENTS

A fiber-reinforced composite includes fibers 10 dispersed in a matrix 12, each individual fibers being surrounded by an interphase 11 so that the interphase is interposed between each fiber and the matrix. The fibers are elongated bodies having length L and diameter $d_f$. Ordinarily, all of the fibers in a composite at least theoretically have the same length L. However, in real composites there are variations in fiber lengths. Accordingly, when the length of the fiber in a real multi-fiber composite is referred to in this disclosure, such reference should be taken as referring to the most probable length of the fibers of the composite, which is ordinarily the median fiber length. Also, the term "diameter" as used with reference to an individual fiber in a composite should be understood as referring to the mean of the external dimensions of the fiber in directions perpendicular to the direction of elongation of the fiber. Most often, fibers used in composites are substantially in the form of circular cylinders and in this case, the diameter as defined herein is simply the diameter as ordinarily understood with reference to a circular cylinder. As in the case of length, references to the diameter of fibers in a real, multifiber composite should be understood as referring to the most probable fiber diameter of the various fibers in the composite. The fibers 10 of the composite in FIG. 1 have an actual aspect ratio $S_{act}$. As used in this disclosure with reference to the fibers in a real composite, the aspect ratio $S_{act}$ of the fibers is the ratio of length to diameter, i.e., $S_{act}$ equals $L/d_f$.

Figure 1:
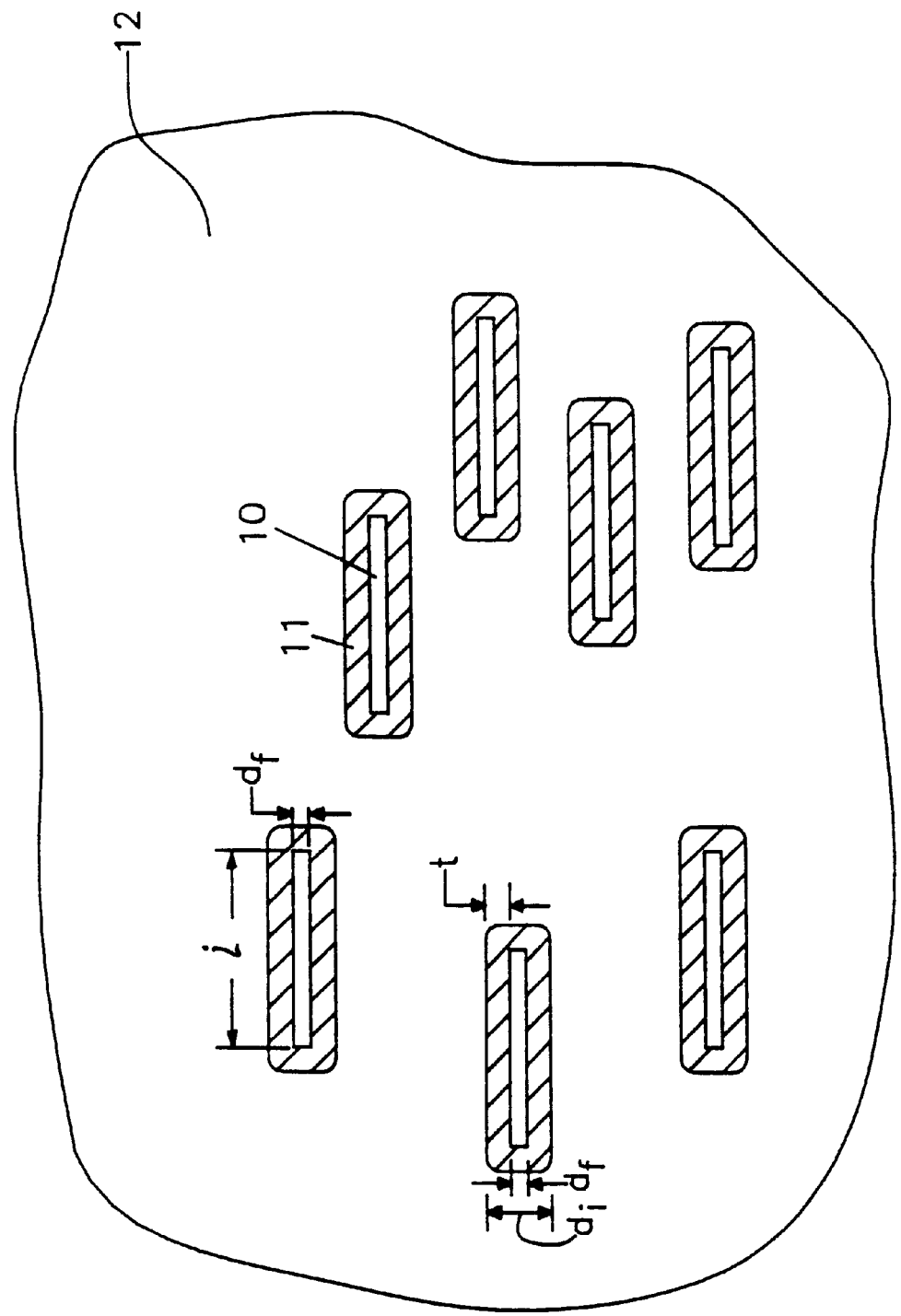
FIG. 1 is a fragmentary diagrammatic view of a composite in accordance with one embodiment of the invention.

The interphase has thickness t. As used in this disclosure, the term "thickness" used with reference to an interphase means the most probable thickness between the circumferential surface of the fiber and the matrix. In a real composite where the thickness of the interphase varies from point to point along each fiber and among the fibers, the most probable thickness normally is the median thickness. Also, in determining the thickness, that portion of interphase at the ends of the fiber, i.e., between the end surfaces of the fiber and the adjacent matrix surfaces, normally should be disregarded. Indeed, although the fibers are illustrated in FIG. 1 as being surrounded by the matrix at the ends as well as at the circumferential surfaces, it is not essential to provide the interphase between the end surfaces of the individual fibers and the adjacent matrix. Thus, in some cases the interphase may surround only the circumferential surfaces of the fibers, and the end surfaces may be in direct contact with the matrix.

The composite illustrated in FIG. 1 is a "unidirectional" composite, i.e., the fibers extend generally parallel to one another. The composite of FIG. 1 is also a "discontinuous" fiber composite. That is, the fibers have finite lengths and hence finite aspect ratios. Typically, the lengths of the individual fibers in a discontinuous composite are appreciably less than the external dimensions of the entire composite in the direction of elongation of the fibers.

The degree to which structural loads applied to the composite are taken by the fibers 10 as opposed to the interphase 11 or the matrix 12 varies with the physical properties of the matrix and the fibers, and with the length of the fibers. For any particular combination of matrix, interphase and fiber, there is a critical length $L_c$ such that when a tensile load is applied to the composite in the direction of the fibers, both the fiber and the matrix fracture simultaneously. For fiber lengths below the critical length, the matrix breaks first, whereas for fiber lengths above $L_c$ the fiber breaks first.

The same phenomenon can be stated in terms of a critical aspect ratio $S_c$. That is, the critical aspect ratio is the ratio of length to diameter corresponding to the critical length, and hence denotes the aspect ratio or ratio length to diameter at which the fiber and the matrix fracture simultaneously.

Figure 2:
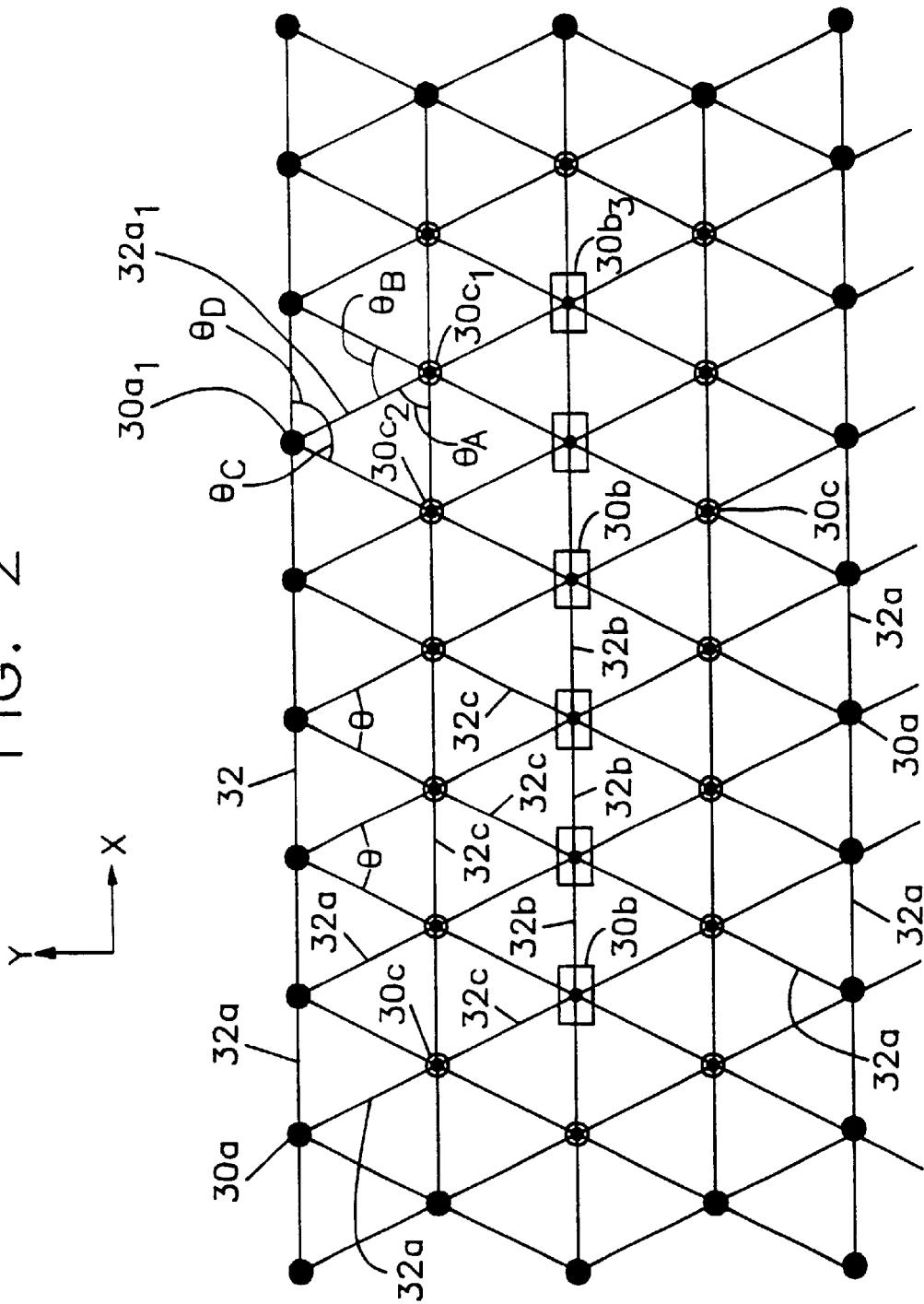
FIG. 2 is a diagram depicting a model in accordance with one embodiment of the invention.

The critical aspect ratio for a composite can be determined by a nodal model. A nodal model as referred to herein is a representation which may be either a physical, structural model or, more preferably, a mathematical model implemented in an analog or, preferably, a digital computer. The assumed geometry of one model in accordance with this aspect of the invention is schematically illustrated in FIG. 2. The model includes a plurality of nodes 30 interconnected by a plurality of bonds 32. Nodes 30 and bonds 32 are notional, i.e., features of the model which need not exist in physical form but need only exist in the form of representation used in the model. Nodes 30a (denoted by solid dots) represent points in a matrix whereas nodes 30b (denoted by a dot in a square box) represent points in a fiber and nodes 30c (denoted by dots in circles) represent points in the interphase.

Bonds 32 represent interconnections between nodes 30 as the relationships between relative displacement of the points represented by the nodes and forces acting along the length of lines between these points. The bonds between each node and its nearest neighbor thus represent the mechanical properties of the fiber, the interphase and the matrix as interrelationships between displacement of each node relative to each adjacent node and forces between these nodes. In the particular scheme shown in FIG. 2, the fiber is modeled as a body of unit diameter, i.e., there is only one row of nodes 30b representing the fiber, whereas the remaining nodes represent the matrix. The interphase is modeled as a layer of unit thickness incorporating one layer of nodes surrounding the fiber, i.e., only one layer of nodes disposed on either side of the row of nodes representing the unit-thickness fiber. The assumption represented in the particular model illustrated that the interphase is a layer of unit thickness implies a ratio of interphase diameter to fiber diameter, i.e., a ratio between the outside diameter of the region occupied by the interphase ($d_i$, FIG. 1) and the diameter $d_f$ of the fibers. For materials with reasonable Poisson's ratios, this implicit diameter ratio $d_f/d_i$ is about 1 to about 20, and hence the model predicts the behavior of systems where $d_i/d_f$ is within or close to this range. This range can be restated in terms of the interphase thickness t, i.e., $t/d_f$ is about 1 to about 10. Thicker interphases can be modeled using greater numbers of rows of interphase nodes. For example, with two rows of interphase nodes 30c on either side of the row of fiber nodes 30b, the model represents a composite for which $t/d_f$ is about 2 to about 20. Also, the particular model illustrated in FIG. 2 is a two dimensional model. Thus, although the real physical fiber is a three dimensional body, it is represented in two dimensions in the mathematical model by only a single layer of nodes. Stated another way, the mathematical model does not include any nodes disposed below or above the plane of the drawing in FIG. 2.

Bonds 32 are treated in the model as tension springs having spring constants proportional to the tensile modulus of the particular material present along the long axis of the bond. Thus, each matrix bond 32a connecting nodes 30a within the matrix or connecting a node 30a of the matrix with a node 30c of the interphase is treated as a spring having spring constant proportional to the elastic modulus $E_m$ of the matrix, whereas fiber bonds 32b extending from one fiber node 30b to another fiber node 30b are treated as having a spring constant proportional to the elastic modulus $E_f$ of the fiber. Each interphase bond 32c interconnecting a node 30c of the matrix and a node 30b of the fiber, or interconnecting two nodes 30c of the interphase is treated as having a spring constant proportional to the elastic modulus $E_i$ of the interphase. Stated another way, the force directed along each bond between 32a is taken as equal to $E_m(r-r_o)$ where r represents the length of such a bond under the conditions in question and $r_o$ represents the length of the bond under the starting or zero strain condition. Likewise, for any bond 32b the force along the bond is taken as equal to $E_f(r-r_0)$, and for any bond 32c the force along the bond is taken as equal to $E_i(r-r_o)$.

To additionally represent the shear resistance of the materials, the model includes torsional or "three body" components. These torsional components can be envisioned as representing torsion springs connected between each pair of intersecting bonds 32. The deformation of each such torsion spring is taken as proportional to the change in the angle θ between each pair of intersecting bonds. For angles between two matrix bonds 32a or angles between one matrix bond 32a and one interphase bond 32c, torsional spring constant $c_m$ is assumed to be one-seventh of the elastic modulus $E_m$ of the matrix material. This incorporates the assumption that the matrix material has a Poisson ratio of 0.1. Likewise, for each angle between two interphase bonds 32c or between one interphase bond and one fiber bond, the torsional spring constant $c_i$ is assumed to be $E_i/7$, which carries a similar implicit assumption that the Poisson ratio of the interphase is 0.1. Because the fiber is represented by a single row of nodes which remains straight during operation of the model, the torsional spring constant of the fiber ("$c_f$") has no meaning.

In this regard, polymer matrices generally have Poisson ratio or $v_m$ about 0.3, whereas the Poisson ratio or $v_f$ of real glass fibers typically is about 0.2. However, because the model uses only a single row of nodes to represent the fiber, it implicitly assumes that $v_f$ is 0, i.e., that the single-row fiber has no poisson ratio. Accordingly, the assumption that $v_m$ is 0.1 preserves the realistic relationship $v_m$31 $v_f$=0.1. Thus, the torsion is given by $c(\theta-\theta_o)$ for each pair of intersecting bonds wherein θ represents the angle between the intersecting bonds, $\theta_0$ represents the angle between the same bonds at the 0 strain condition and c is $c_m$ or $c_i$ depending on the types of bond constituting the angle.

As will be appreciated, each bond 32 forms part of several such intersections and hence forms part of several such notional torsional springs. Thus bond $32a_1$ forms part of four angles $\theta_A$, $\theta_B$, $\theta_C$ and $\theta_D$. Each such notional angle θ is a "three body" term in that it is a function of the positions of three nodes. For example, $\theta_A$ in FIG. 2 is a function of the positions of nodes $30a_1$, $30b_1$ and $30b_2$.

The total strain energy in the system is given by $$H = \left[\frac{1}{2}\right]\sum_{ij}(E_{ij}(r_{ij}-r_o))^2 + \left[\frac{1}{2}\right]\sum_{ijk}(c_{ijk}(\cos\Theta_{ijk}-\cos\Theta_o))^2$$

in which
 i, j designates all of the various bonds;
 i, j, k designates all of the angles;
 $r_{ij}$ represents the bond length or distance r between any pair of adjacent nodes i and j;
 $E_{ij}$ is $E_m$ (for i, j designating a matrix bond 32a) or $E_f$ (for i, j designating a fiber bond 32b) or $E_i$ (for i, j denoting an interphase bond);
 $r_0$ represent the starting lengths of the various bonds, all of which are assumed equal;
 $\theta_{ijk}$ represents any one of the aforementioned angles, $\theta_O$ represents the starting value of that angle, which is assumed to be 60 degrees; and
 $c_{ijk}=c_i$ if bonds ij and jk are both interphase bonds or one fiber and one interphase bond, and $c_{ijk}=c_m$ if bonds ij and jk are both matrix bonds or one matrix and one interphase bond respectively. In the situation where ij and jk are both fiber bonds, the form in parentheses is always zero, given the assumption that the fiber does not bend.

In the model, energy associated with any individual bond is taken as:

$$h_{ij} = \frac{1}{2}(E_{i,j}(r\ r_o))^2 \frac{1}{2}\left[\frac{1}{2}\sum_{i,j,k=neighbors}(c_{i,j,k}(\cos\Theta_{i,j,k}-\cos\Theta_o))^2\right]$$

in which $h_{ij}$ is the energy of the particular bond in question.

The expression "ijk=neighbors" indicates that the summation is taken over those angles θ which are neighbors to the bond in question, i.e., those angles between the bond in question and another bond. For example, with respect with bond 32a1 in FIG. 2, the sum would include terms for $\theta_A$, $\theta_B$, $\theta_C$ and $\theta_D$. Only one-half of the energy associated with each such neighboring angle is attributed to the bond in question in the foregoing formula. Thus, the energy $h_{ij}$ of a particular bond is taken as including the entire energy associated with elongation of that bond and one-half of the energy associated with deformation of each neighboring angle.

Figure 3:
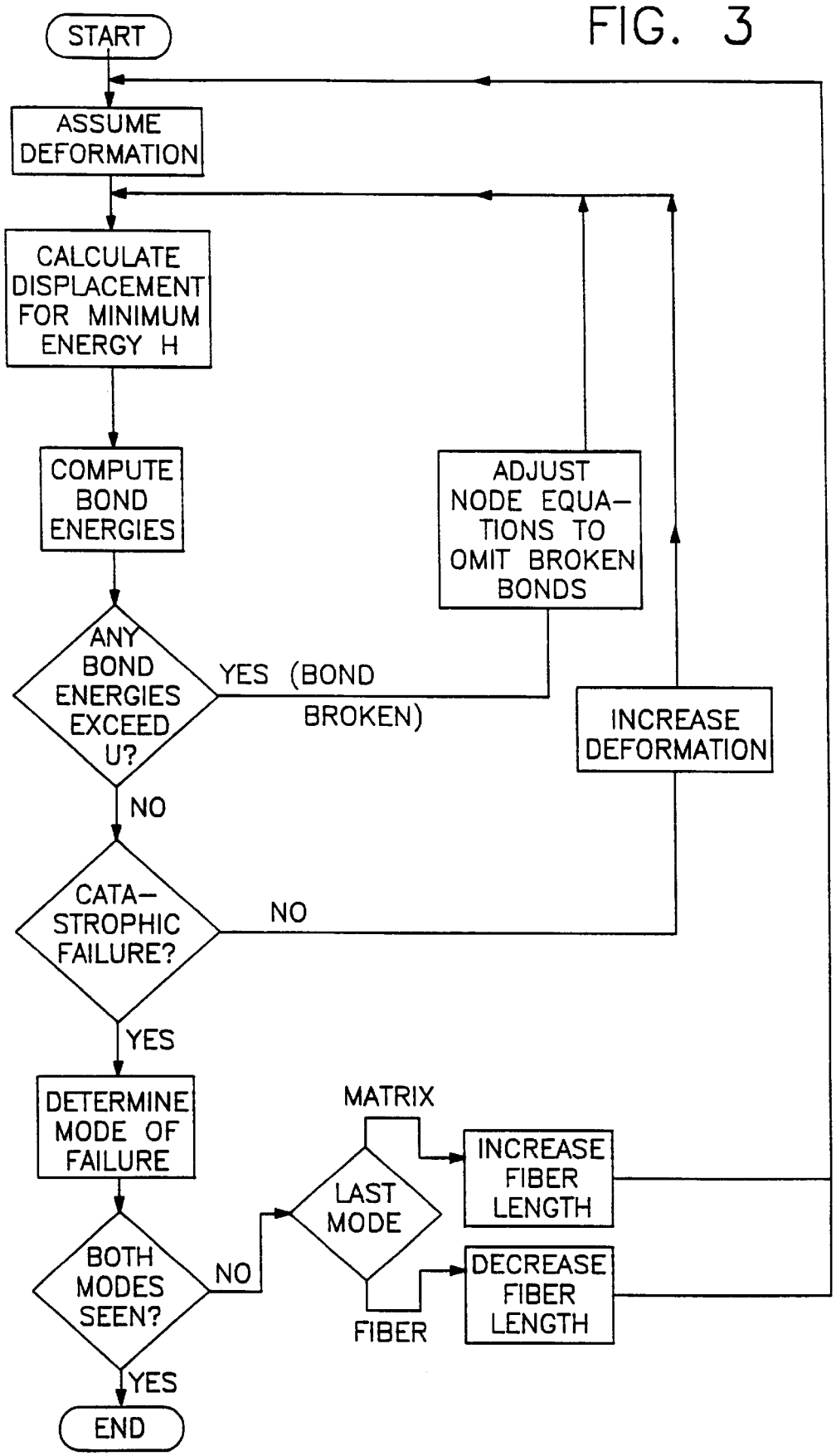
FIG. 3 is an operational flow chart showing portions of the operation of the model of FIG. 2.

The model is operated according to the general scheme shown in FIG. 3. The fiber length evaluated in any particular run of the model is implicit in the characterization of particular nodes as part of the fiber or part of the matrix. For example, the model could be made to simulate a shorter fiber length by assuming that node $30b_3$ is contained in the matrix rather than in the fiber, and by adjusting the characteristics of the associated bonds accordingly. The properties of the matrix, interphase and fiber material are reflected in the assumed values for the elastic modulus $E_m$, $E_i$, and $E_f$, and in values of cohesive energies of the fiber, interphase and matrix $U_f$, $U_i$ and $U_m$, which are also assumed. Given those assumptions, the model is cycled through the illustrated operations. At the start of the operation, it is assumed that the model structure is deformed to some arbitrarily selected amount. Using the visualization of FIG. 2, this would amount to an assumption that nodes on the left-hand end of the drawing remain in place whereas the nodes on the right-hand end of the drawing are displaced to the right, along the x or fiber axis direction, by the amount corresponding to the arbitrarily selected deformation.

In the next step of the operation, the positions of all of the other nodes are selected to yield the lowest overall strain energy H, according to the above-mentioned formula for H. That is, from a universe consisting of all of the possible sets of node positions r in the x and y directions indicated by the labelled x and y axes in FIG. 2 (the fiber direction and cross-fiber direction) which are consistent with the assumed deformation and hence consistent with the assumed position of the end nodes, the particular set of node positions for which H is at a minimum is found.

As will be appreciated, the value of r and $\theta$ for each bond and angle in the model is uniquely determined for each set of node positions, and hence the value of H for each possible set of node positions in the x and y directions is calculable according to the formula stated above. Stated another way, H is a dependent variable which is a function of all of the position-specifying independent variables, i.e., the x and y position value for all of the nodes. Thus, the problem of selecting the x and y values which give the lowest H value is simply the problem of finding the values for multiple independent variables associated with a minimum value for a function of those independent variables. Mathematical techniques for finding the minimum of a function of multiple independent variables, and finding the values of the independent variables associated with the minimum are well known. These are also referred to as "minimization" techniques. Any such known techniques can be used. Generally, these techniques involve iteration or trial and error, i.e., trying various sets of the independent variable until the particular set which yields the minimum is found. The sets to be tried may be selected according to any one of numerous, known mathematical algorithms. Suitable minimum finding algorithms are disclosed in the text Numerical Recipes, The Art of Scientific Computing, by Press et al., Cambridge University Press, 1986, and particularly in chapter 10 of that text concerning minimization or maximization of functions. The disclosure of said chapter is hereby incorporated by reference herein.

Minimization methods operate in the multi-dimensional space defined by the plural independent variables and proceed by conducting a series of "line minimizations", i.e., by selecting a particular line in that multi dimensional space and moving along that line until at least a local minimum is found. So-called gradient methods use the gradient of the function, i.e., the vector composed of the first partial derivatives of the function in multi dimensional space, as a guide for selecting the directions of the various lines used for these line minimizations. The so-called "steepest descent" method conducts a line minimization in an arbitrary direction and then conducts a further line minimization along a line in the direction of the gradient at that local minimum so as to find yet another local minimum, and repeats the process again and again. Although such an algorithm will eventually converge at the true or global minimum, it is generally less preferred because it is relatively slow. A better, more preferred minimization technique is referred to as the conjugate gradient method. In the conjugate gradient method, successive line minimizations are conducted along a series of directions which are selected such that the succeeding directions are conjugate to one another. That is, the product of a vector in one such direction and a particular matrix referred to as the "Hessian" matrix yields a vector which, when multiplied with the next succeeding vector is zero, and each such directional vector passes through the local minimum along the line in the immediately preceding vector direction. Specific algorithms for performing conjugate gradient minimization are well known and are set forth in the aforementioned Press et al. text, particularly at pages 305–306 thereof.

After selecting the particular node positions which yield the minimum strain energy H for a model as a whole, the next step is to compute the strain energy $h_{ij}$ associated with each bond according to the formula above. These computed individual bond energies $h_{ij}$ are then individually tested against the appropriate cohesive energy for the particular bond. That is, the bond energy for each matrix bond 32a is compared against the cohesive energy $U_m$ for the matrix, whereas the strain energy for the fiber bond 32b is compared against the cohesive energy $U_f$ of the fiber and the strain energy for each interphase bond 32c is compared with the cohesive energy $U_i$ of the interphase. If the strain energy associated with any particular bond exceeds the cohesive energy associated with that bond, the particular bond is deemed to have broken.

This step of the procedure is directly related to a significant feature of the model. Because the formulas for total strain energy and, particularly, the formula for strain energy associated with a particular bond incorporate terms representing both tensile and shear stresses, the model reflects bond breakage occurring as a result of combined tensile and shear effects. If a bond is found to be broken in this stage of the model operation, the equations defining the model are adjusted to take account of the broken bond. That is, in subsequent calculations it is assumed that the broken bond has 0 tensile modulus and 0 shear modulus so that in subsequent calculations it is assumed that for bonds which are broken, and for angles neighboring broken bonds, $E_{ij}$ and $c_{ijk}$, respectively, are 0. Stated another way, the structure of the model is readjusted to take account of the broken bonds. After such readjustment, the model returns to the step of calculating the particular positions of the nodes which would yield the minimum total strain energy H. As will be appreciated, these new positions would normally differ from the positions providing the minimum total strain energy with all unbroken bonds.

After recalculation of the minimum, the individual bond energies are calculated once again for the new node positions and once again tested against the appropriate values of U to check for further broken bonds. If further broken bonds are found, the process is repeated again until the calculation of the node displacement as described above yields no further broken bonds. Once this condition is reached (either on the first calculation of the minimum strain energy or on a subsequent calculation after readjustment of the model equations) the result is checked to determine whether or not a catastrophic failure has occurred, i.e., whether a row of broken bonds extend entirely across the matrix. If not, the originally assumed deformation is increased and the aforementioned steps are repeated again.

This cycle of operations is repeated until the model does indicate that a catastrophic failure has occurred. At this point, the model determines from the identities of the broken bonds the mode of failure, i.e., whether failure has occurred in the matrix only or in the fiber as well as in the matrix. The model also provides data such as elongation to fracture, toughness, elastic modulus and breaking strength for the particular composite modelled. Elongation to fracture is proportional to the deformation applied in the model when fracture occurs. The tensile load is simply the vector sum of bond force components parallel to the fiber. Toughness is obtainable by summing the product of tensile load and elongation from start to fracture. After simulating a first catastrophic failure, the model then increases or decrease the fiber length by a preselected increment, which may be a fixed amount or a fixed percentage of the fiber length. If the catastrophic failure observed with the last fiber length used was a matrix-only failure, the model increases the fiber length, whereas if a fiber failure was observed, the model decreases the fiber length. After increasing or decreasing the fiber length, the model repeats the operations discussed above to simulate another catastrophic failure with the new fiber length. This cycle continues until at least one fiber failure and at least one matrix-only failure have been simulated. The critical length or boundary between matrix-only and fiber failures is taken as midway between the highest fiber length giving a matrix-only failure and the lowest fiber length giving a fiber failure. The model critical-aspect ratio is equal to this critical length divided by the assumed diameter of the fiber. As the particular model at FIG. 4, assumes a unity-diameter fiber, the critical aspect ratio is equal to the critical length. Thus, for any given values of $E_f$, $E_i$, $E_m$, $U_f$, $U_i$ and $U_m$, the model will determine the critical aspect ratio.

The term "model critical aspect ratio" (symbolized $S_{c,nm}$) as used in this disclosure, means the critical aspect ratio determined in this manner using the model described above. The model critical aspect ratio $S_{c,nm}$ is a function of the elastic moduli and cohesive energies of the fiber, matrix and interphase, together with the interphase thickness assumed in the model. Thus, these interphase define the model critical aspect ratio.

Physical properties used in the model can be taken from standard property values reported in known compendia of materials property data. Cohesive energy values should be taken from data derived from physical tests or microscale samples, such as from tests of diameter fibers of about the diameter normally used in composites. This data is commonly available. Where cohesive energy data is derived from tests of microscale samples such as fibers, the data ordinarily is not substantially influenced by extraneous factors such as defects in the samples, as typical fibers have a very low concentration of such defects. In particular, glass fibers ordinarily have a relatively low concentration of defects. Cohesive energy data for glass fibers derived from well-conducted breaking tests of the fibers normally reflect the true cohesive energy of the fibers. However, large-volume samples of materials, in the sizes commonly used for engineering physical data property tests on such materials, usually incorporate a substantial number of defects. Cohesive energy values derived from tests of such samples typically reflect cohesive energy far lower than that would be achieved by testing a substantially defect-free sample.

Figure 4:
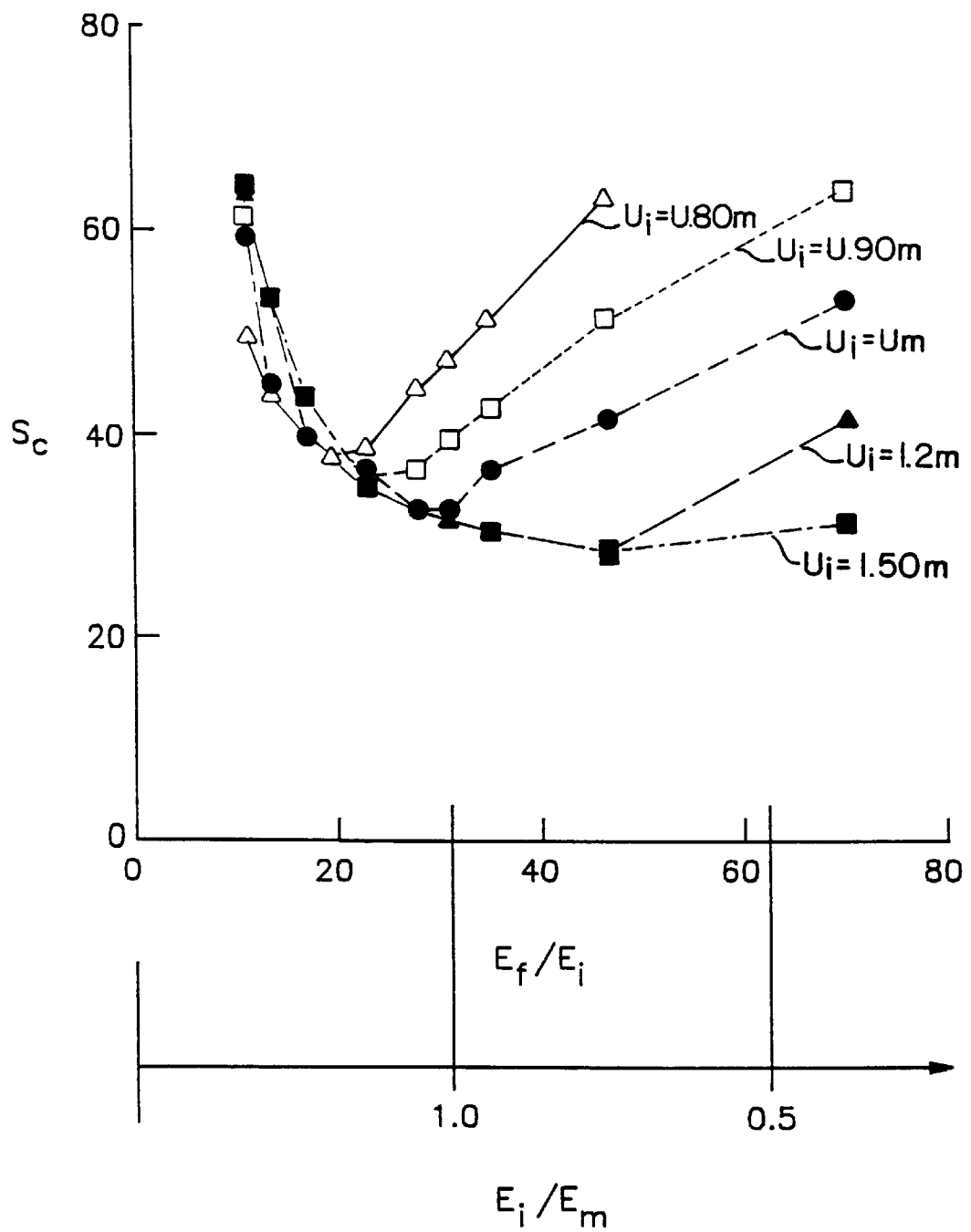
FIGS. 4 and 5 are graphs illustrating certain properties of composites.
Figure 5:
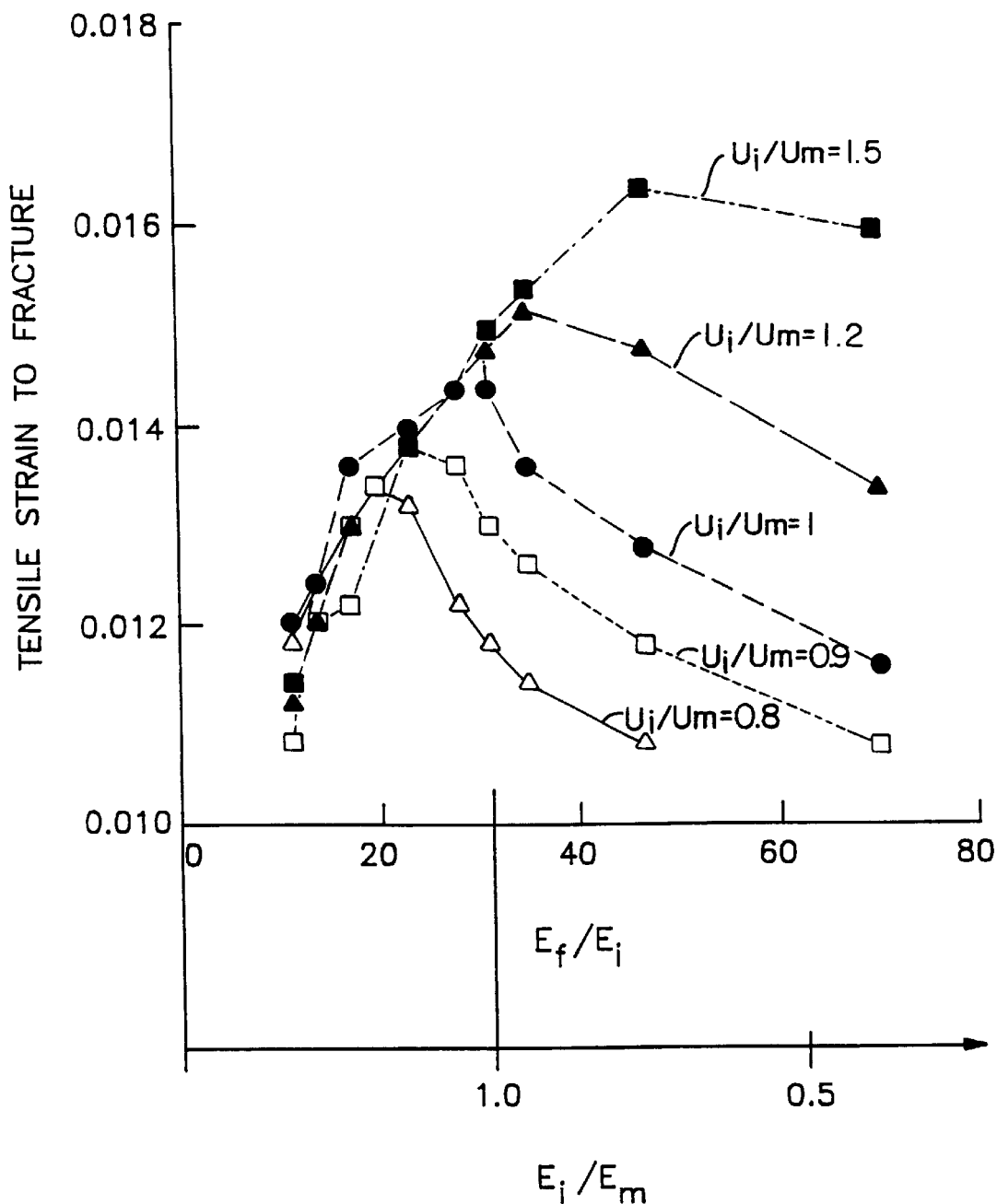

Operation of the model with different values for the matrix, fiber and interphase moduli and cohesive energies yields certain striking results which are depicted schematically in FIGS. 4 and 5. FIG. 4 is a plot of critical aspect ratio against interphase modulus (expressed as a ratio $E_i/E_m$ and also expressed as the corresponding ratio $E_f/E_i$) for composites in which $E_f/E_m$ is 31.1. Different sets of data were accumulated using the model with different values for $U_i$. The various lines do not represent a least squares or other curve fit but instead are added simply to connect points taken with the same value of $U_i$. As illustrated, $U_i$ has a profound effect on the critical aspect ratio in those cases where $E_i$ is less than about 1.0. In these cases, increasing the value of $U_i$ dramatically reduces the critical aspect ratio. For example, with $E_i$ of about 0.8 $E_m$ ($E_f/E_i$ equal about 45), the critical aspect ratio with $U_i=1.5U_m$ (or with $U_i=1.2U_m$) is about 30 whereas with $U_i=0.8U_m$, the critical aspect ratio is more than twice as high. Similar results seen at $E_i/E_m$ equal about 0.4, and the trend of the data is unambiguous. Stated another way, within the region where $E_i$ is less than $E_m$, increased interphase cohesive energy provide substantially reduced critical aspect ratio and hence reduced critical length. In this regime, an increase in the interphase toughness permits use of shorter fibers while still providing full load sharing between the matrix and the fibers.

FIG. 5 depicts the tensile strain to fracture of composites, all having fiber elastic modulus $E_f=31.1E_m$. All of the composites depicted have fibers with an actual aspect ratio $S_{act}$ equal to the model critical aspect ratio. In each case, the interphase thickness is modeled as about 1 to about 10 times the fiber diameter $d_f$. As shown in the FIG. 5, in the case of composites having $E_i$ less than $E_m$ ($E_i/E_m$ less than 1.0) increasing $U_i$ (higher $U_i/U_m$) leads to dramatic improvements in tensile strain to fracture and hence dramatic improvement in toughness of the composites. In particular, composite with relatively low $E_i$ ($E_i/E_m$ lower than 1.0 and particularly below about 0.8) and also having relatively high values of $U_i$ ($U_i/U_m$ above 1.0 preferably above 1.2 and most preferably above 1.5 or above) yield the highest tensile strain to fracture. Similar enhancements are attained generally for other composites having relatively stiff fibers, i.e., $E_f/E_m$ above about 10, preferably above about 20 and most preferably between about 20 and above 100.

Accordingly, a further aspect of the invention defines composites which exploit these enhanced properties. Composites according to this aspect of the invention most preferably have $E_i$ less than $E_i/E_m$ and desirably about 0.2 to about $0.8E_m$, most preferably about 0.4 to about $0.8E_m$, and have $U_i$ greater than $U_m$, desirably about $1.2U_m$ or more and most preferably about $1.5U_m$ or more. These composites desirably have $E_f$ equal to about $10.E_m$ or more, more preferably about $20E_m$ or more and most preferably between about $20E_m$ and about $100E_m$. Preferably, the interphase thickness t is between about 0.1 and about 10 times the fiber diameter $d_f$ most preferably about 0.2 to about 2 times $d_f$. The composites according to this aspect of the invention most preferably are "supercritical" discontinuous fiber composites. That is, the fibers are relatively short but nonetheless have lengths greater than the critical length. Stated another way, the actual aspect ratio of the fibers $S_{act}$ desirably is greater than the model critical aspect ratio $S_{c,nm}$ which would be predicted by the model for the composite in question. Desirably, $S_{act}$ is less than about 75 times $S_{c,nm}$ and most preferably less than about 25 times $S_{c,nm}$. As noted above, the model critical aspect ratio is a function of the other properties in the composite and hence any composite has a model critical aspect ratio regardless of whether one actually operates the model to determine the model critical aspect ratio for the composite in question. Another way to determine whether or not a composite is supercritical is to test the composite and determine whether or not the fibers fracture on a tensile load is applied to the composite in the direction of the fibers. If substantially all of the fibers fracture, then the composite in question is supercritical. Stated another way, in a composite where the fibers fracture under such a test, the actual aspect ratio of the fibers $S_{act}$ necessarily is greater than the real critical aspect ratio $S_{c,real}$ marking the boundary between fiber fracture and matrix only fracture in actual testing.

Composites according to this aspect of the invention most preferably incorporate an organic polymer matrix. The organic polymer matrix may be selected from the group consisting of thermoset and thermoplastic polymers. Among the thermosetting polymers, polymers selected from the group consisting of polyester, epoxy, vinlyester, bismaleimide, phenolic and polyimides are preferred. Among the thermoplastics, polymers selected from the group consisting of polystyrene, polycarbonate, polymethylmethacrylate and polyolefins are preferred, polypropylene being particularly preferred. The fiber material desirably is selected from the group consisting of polyethers, aramids, metallic materials and non-metallic inorganic materials, and most preferably selected from the group consisting of carbon and glass. The interphase material may be a material chemically different from the fiber material and different from the matrix. Among the preferred interphase materials are thermoset and thermoplastic polymers selected to have the appropriate modulus and toughness relative to the matrix polymer. These interphase materials preferably are applied to the fibers prior to incorporation of the fibers into the composite, as by conventional processes of coextrusion, dip coating or the like. Typically, the fibers are in continuous form during such processes are cut to the lengths required in the final composite after application of the interphase material.

Alternatively, the interphase material may be of the same composition as fiber or matrix material, but in a different physical state. With crystalline or partially crystalline matrix polymers, the interphase may be formed from material chemically identical to the matrix material but differing from the matrix material in degree of crystallinity, crystalline morphology or both. One way such differing crystalline morphologies can be produced is by combining the fibers with the molten polymer and allowing the polymer to crystallize in presence of the fibers under conditions such that the fibers affect the crystallization process in the vicinity of the fibers. Thus, the fibers may promote nucleation of crystals in the vicinity of the fibers, thereby forming an interphase which is crystallized differently than the bulk polymer constituting the matrix. The fiber material itself may serve to promote nucleation. Also, the fibers may carry a nucleating agent on their surfaces. In one such differential crystallization arrangement, fibers bearing a nucleating agent such as the sodium salt of methylene bis (2,4-di-t-butylphenol) acid phosphate commonly sold under the designation MI.NA11 may be employed with isotactic polypropylene. Other suitable nucleating agents include bis (methylbenzylidene sorbitol), quinacridone based pigments, sodium benzoate and di-para-tert.-phenyl-phosphate. Fibers are coated by passing fibers through a solution of the nucleating agent in any liquid which can dissolve the agents, at a concentration of 0.05–10 percent, with 0.5–3.0 percent being preferred. The polymer is then processed with the coated fibers in the normal way using any conventional composite processing procedure.

Nucleation tends to cause growth of polypropylene crystals in lamellar, columnar arrangement extending generally radially with respect to the fiber. Such a lamellar arrangement, if crystallized under appropriate conditions to provide the requisite physical properties discussed above, can provide a suitable interphase. For polypropylene transcrystallinity may be obtained either with the α-phase or the β-phase of polymerization, with the β-phase preferred. The preferred nucleating agents ordinarily yield the β-phase.

The composite may incorporate physical means for modifying the properties of one or more of the interphase or the fiber, the interphase or the matrix, or both so that the fiber, interphase or matrix exhibit apparent properties different from the intrinsic properties of the pure, solid fiber material, interphase material or matrix material. Stated another way, the physical means incorporated in the fiber, interphase or matrix change the way in which these materials act, so that they act as if they had physical properties different from those of the pure, solid materials. For example, the fiber may be hollow to provide a lower spring constant than a solid fiber of the same material. Thus, the fiber acts in the same way as a solid fiber formed from a material having a lower value of $E_f$. This lower value of $E_f$—the value for $E_f$ required to provide a solid cylindrical fiber having the same outside diameter $d_f$ and tensile spring constant as the hollow fiber is referred to herein as the apparent elastic modulus $E_{f,app}$ of the fiber. Stated another way, the fiber acts as if it were a solid fiber formed from material of apparent modulus $E_{f,app}$. Alternatively, the fiber may include a core of different modulus material which effectively changes the apparent elastic modulus of the material constituting fiber 44. Other fiber configurations may be used to alter the apparent elastic modulus of the fiber material. For example, the fiber may be formed with voids or the like.

The matrix and/or interphase may also be modified to exhibit properties different from the intrinsic elastic modulus of the matrix material itself. For example, small particles of a high filler such as microscale particles having diameters appreciably less than the interphase thickness may be incorporated in the matrix. For the interphase, molecular additives, such as $C_{60}$ and related fullerenes, may be used to lower the modulus and increase the toughness of interphase, relative to the matrix polymer. The resulting set of apparent fiber, matrix and interphase properties desirably may cooperatively define a model critical aspect ratio $S_{c,nm}$ lower than the intrinsic model critical aspect ratio which would be defined by the intrinsic properties of the pure materials themselves. Unless otherwise specified, references in this disclosure to physical properties of a material are to the apparent physical properties of the material in the form in which it appears in the composite, rather than to the intrinsic physical properties.

Composites with desirable physical property combinations discussed above can be provided without the calculations. Calculations and models as discussed above can be used to determine whether or not a particular modification would be successful or desirable.

However, the model discussed above can be exploited directly in manufacture of composites. This process of composite manufacturing includes operating the nodal model and selecting real fiber, interphase and matrix materials and real fiber length and real interphase thickness, based at least in part upon the results observed in operation of the model. The physical properties of the composite may be selected to conform to properties employed in the model. Preferably, the model is operated to predict critical length for at least one set of parameters, and real fiber length greater than the predicted critical fiber length is selected. The selected fibers, matrix and interphase are then incorporated in a real composite by conventional composite-fabrication techniques such as molding or lay-up processes. In a particularly preferred arrangement, the model is operated to predict behavior for different combinations of parameters representing different notional composites. An optimum notional composite is selected from among these based upon predicted physical properties. The real materials and dimensions incorporated in the composite are selected to match the optimum notional composite, giving the best behavior of all of those sets modelled, as, for example, the maximum elongation to break or the lowest critical length.

The nodal model discussed above can be modified to dispense with certain of the assumptions used in the preferred nodal model illustrated. For example, the nodal model can be modified to more closely simulate a multiple fiber, concentrated composite, as by incorporating more nodes representing more fibers. This, however, results in a considerable increase in the computer time required to implement the model. Also, the particular geometric configuration of nodes illustrated in FIG. 2 is preferred but not essential. Thus, other mathematically equivalent configurations can be employed. Also, although the preferred models are implemented in a digital computer, other modeling techniques can be employed.

As these and other objects, features and advantages of the present invention can be used without departing from the invention as defined in the claims, the foregoing description of the preferred embodiment should be taken by way of illustration rather than by way of limitation of the invention as claimed.

What is claimed is:

1. A method of making a composite incorporating a fiber, a matrix and an interphase comprising the steps of:
   (a) storing a nodal model of a composite in an analog or digital computer, said model comprising
      (1) a plurality of notional spaced-apart nodes representing points within a notional fiber of finite aspect ratio surrounded by a notional interphase extending in a notional matrix and
      (2) functions representing physical properties of said notional fiber, matrix and interphase as interrrelations between displacement of each said node relative to each adjacent node and strain energy, said functions defining said interrelations so that said strain energy includes components representative of shearing stress of said matrix material and said interphase,
   (b) inputting at least one notional deformation into said computer;
   (c) actuating said computer to apply said notional deformation such that said functions indicate that said notional composite would fracture under said notional deformation, and determining at least one property of said composite from said functions;
   (d) varying the value of at least one said physical property of said fiber, matrix or interphase in said functions and repeating said inputting and actuating steps for each such variation whereby on each repetition said computer-operated model indicates the property of said composite for different values of said varied physical property;
   (e) determining an optimum value for said varied physical property dependent upon the physical properties of said composite indicated by said model for said different values, and
   (f) forming at least one real composite having a real fiber, real matrix and real interphase with said optimum property.

2. A method as claimed in claim 1 wherein said model includes notional bonds interconnecting said notional nodes, each such bond representing particular portions of said notional matrix, fiber and interphase, and functions including relationships between strain energy and length of said bonds.

3. A method as claimed in claim 2 wherein said nodal model includes notional angles between said bonds, said functions including relationships between strain energy and said angles.

4. A method as claimed in claim 3 wherein said step of operating said model includes the steps of determining the strain energy absorbed by each said bond and determining whether such bond has fractured by comparing such strain energy with the cohesive energy of the fiber or matrix.

5. A method as claimed in claim 4 wherein said step of determining the strain energy absorbed by each said bond includes the step of allocating to each said bond a portion of the strain energy associated with each said angle between the bond and another bond.

6. A method as claimed in claim 1 wherein said step of determining includes the step of determining from said functions whether such fracture of said composite would involve fracture of the fiber or fracture of only the matrix and repeating said steps with the model representing fibers of different lengths until the model shows matrix only fracture for fibers of a first aspect ratio and fiber fracture for fibers of a second aspect ratio and thereby predicts a critical aspect ratio between said first and second aspect ratios.

* * * * *